United States Patent
Liao et al.

(10) Patent No.: US 11,263,168 B2
(45) Date of Patent: Mar. 1, 2022

(54) FPGA COPROCESSOR WITH SPARSITY AND DENSITY MODULES FOR EXECUTION OF LOW AND HIGH PARALLELISM PORTIONS OF GRAPH TRAVERSALS

(71) Applicant: Huazhong University of Science and Technology, Hubei (CN)

(72) Inventors: Xiaofei Liao, Hubei (CN); Hai Jin, Hubei (CN); Long Zheng, Hubei (CN); Chengbo Yang, Hubei (CN)

(73) Assignee: Huazhong University of Science and Technology, Hubei (CN)

( * ) Notice: Subject to any disclaimer, the term of this patent is extended or adjusted under 35 U.S.C. 154(b) by 0 days.

(21) Appl. No.: 16/722,082

(22) Filed: Dec. 20, 2019

(65) Prior Publication Data
US 2020/0242072 A1    Jul. 30, 2020

(30) Foreign Application Priority Data
Jan. 29, 2019   (CN) .......................... 201910084423.9

(51) Int. Cl.
*G06F 9/38*   (2018.01)
*G06F 15/82*   (2006.01)
(Continued)

(52) U.S. Cl.
CPC ............ *G06F 15/76* (2013.01); *G06F 9/3877* (2013.01); *G06F 15/7889* (2013.01);
(Continued)

(58) Field of Classification Search
CPC .. G06F 9/3877; G06F 15/7889; G06F 15/825; G06F 2015/768
See application file for complete search history.

(56) References Cited

U.S. PATENT DOCUMENTS

2009/0164812 A1*  6/2009  Capps, Jr. ............. G06F 1/3203
                                                               713/320
2017/0315846 A1*  11/2017  Wang .................... G06F 9/5038
(Continued)

OTHER PUBLICATIONS

Fadel Abdallah, Camel Tanougast, Imed Kacem, Camille Diou and Daniel Singer. "A comparison of two metaheuristic algorithms for scheduling problem on a heterogeneous CPU/FPGA architecture with communication delays" Proceedings of 2017 4th International CoDIT'17 (Year: 2017).*

(Continued)

*Primary Examiner* — Jacob Petranek
(74) *Attorney, Agent, or Firm* — Michael X. Ye; Rimon Law

(57) ABSTRACT

An FPGA-based graph data processing method is provided for executing graph traversals on a graph having characteristics of a small-world network by using a first processor being a CPU and a second processor that is a FPGA and is in communicative connection with the first processor, wherein the first processor sends graph data to be traversed to the second processor, and obtains result data of the graph traversals from the second processor for result output after the second processor has completed the graph traversals of the graph data by executing level traversals, and the second processor comprises a sparsity processing module and a density processing module, the sparsity processing module operates in a beginning stage and/or an ending stage of the graph traversals, and the density processing module with a higher degree of parallelism than the sparsity processing module operates in the intermediate stage of the graph traversals.

14 Claims, 3 Drawing Sheets

(51) Int. Cl.
 *G06F 15/78* (2006.01)
 *G06F 15/76* (2006.01)
 *G06F 16/901* (2019.01)
(52) U.S. Cl.
 CPC ........ *G06F 15/825* (2013.01); *G06F 16/9024* (2019.01); *G06F 2015/768* (2013.01)

(56) References Cited

U.S. PATENT DOCUMENTS

2018/0143860 A1* 5/2018 Dasu .................. G06F 15/7867
2018/0210730 A1* 7/2018 Sankaralingam ..... G06F 9/3834
2019/0079886 A1* 3/2019 Malladi .................. G06F 9/445

OTHER PUBLICATIONS

Neha Dwivedi, Pradeep Chhawcharia. "Power Mitigation in High-Performance 32-bit MIPS-based CPU on Xilinx FPGAs" 2017 IEEE International Conference on Consumer Electronics-Asia (ICCE-Asia) (Year: 2017).*

Fadel Abdallah, Camel Tanougast, Imed Kacem, Camille Diou, Daniel Singer. "Genetic algorithms for scheduling in a CPU/FPGA architecture with heterogeneous communication delays" Received Jun. 15, 2016; Computers & Industrial Engineering 137 (2019) 106006 (Year: 2019).*

* cited by examiner

FPGA COPROCESSOR WITH SPARSITY AND DENSITY MODULES FOR EXECUTION OF LOW AND HIGH PARALLELISM PORTIONS OF GRAPH TRAVERSALS

This application claims the benefit of the Chinese Patent Application No. CN201910084423.9 filed on Jan. 29, 2019, which is hereby incorporated by reference as if fully set forth herein.

FIELD

The present disclosure relates to field programmable gate array (FPGA) graph computing, and more particularly to an FPGA-based graph data processing method and a system thereof.

DESCRIPTION OF RELATED ART

Graphs represent a classic type of data structures and extensively exist in our daily life in the forms like social networks and highway networks. By processing and analyzing graphs, a lot of useful information can be acquired. Graph traversal algorithms are the most classic algorithms in the field of graph computing. The enablement of many functions is associated with graph traversal, and common graph traversal algorithms include Breadth First Search (BFS), Depth First Search (DFS), and Single Source Shortest Path (SSSP).

The world is composed of various networks and a graph data structure is a mathematical expression of networks. In the late 20th century, researches were done for natural, social and technical networks and it was found that most of these networks share the following features: high clustering, imbalanced degree distribution, and a central node structure. A small-world network is a concept first introduced by Duncan Watts and Steven Strogatz in 1998 in "Nature," for mathematically describing natural networks. In such a network, most nodes are not connected to each other, yet the majority of the nodes can reach each other from any nodes in a few steps through links between the nodes.

A small-world network is a network model that features a relatively small characteristic path length and a relatively large clustering coefficient. Definition of the characteristic path length: arbitrary two nodes are selected from a network, and the two nodes together with the minimal edge number of the two nodes are defined as the path length of the two nodes, while the average of the path lengths of all the node pairs in the network is defined as the characteristic path length of the network. Definition of a clustering coefficient: it is assumed that a particular node has k edges, and the largest possible number of edges existing between the (k) nodes connected by the k edges is equal to $k(k-1)/2$, so that the clustering coefficient of the node is defined as a ration between the actual number of edges and the largest possible number of edges. A log path becomes more and more huge as a network increases structurally, no matter what scale the network is, yet the path length of the network remains relatively short. Therefore, a small-world network has the following properties: due to the presence of the log path, the diameter of the network is relatively short, so the nodes can be reached by only a few steps, as described in the theory called "Six Degrees of Separation"; the clustering coefficient is large, the node degrees are distributed according to the power law, which means the proportion of large-degree nodes is small while low-degree nodes dominate.

The world's first graph computer is Pregel introduced by Google as a distributed system for graph computing. Following it, Graphchi was developed as a standalone graph computer, and Cusha was designed as a graph computer specialized for GPUs. Many graph computing works have been proposed for all of the three processing environments and impressive results have been reached by these graph computing researches. Therein, GraphGen is the first FPGA-based graph computer, yet the development of FPGA-based graph computing is slower than those for the foregoing three processing environments.

An FPGA is a programmable parallel optimizers, and provides users with abundant logical resources, such as gate circuits and on-chip memory BRAM (Block Random Access Memory), allowing users to create various functional circuits according to their design envision. An FPGA has quite high performance per watt, and has better power consumption than a CPU or a GPU having the same performance. With the development of high-performance computing, power consumption has become a property of high interest in the field of high-performance computing. As a large-scale graph processing procedure, graph computing also requires good performance per watt. Besides, an FPGA is of a fine-grained pipeline parallelism design, and well matches high-parallelism iteration required by graph computing, making it an ideal processor for graph computing.

The existing graph computing systems using an FPGA-based design are mainly realized in two ways, namely through CPU-FPGA-based heterogeneous implementation patterns and through FPGA-based graph structure implementation patterns.

CPU-FPGA-based heterogeneous implementation patterns use the respective properties of CPU-based processing and FPGA-based processing. Therein, the CPU is a general-purpose processor, which can deal with low parallelization with few threads. It has very high operating frequency and good instruction design, so it can run procedures with very high efficiency. On the other hand, the FPGA has logical resources abundant enough for fine-grained pipeline parallelism, and thus can deal with high parallelization with tens of thousands of threads. Thus, if parallelization for low degree of parallelism is desired, a CPU is more suitable than an FPGA, but if the application is about parallelization with high degree of parallelism, an FPGA is a better choice over a CPU. Therefore, a CPU-FPGA heterogeneous graph computing system typically runs the beginning/ending stage in the CPU and runs the intermediate stage having a high degree of parallelism in the FPGA. Nevertheless, such a heterogeneous CPU-FPGA graph computing structure has the following defects. First, for the system to switch between the CPU and the FPGA, it is required to stop the procedure running of the current processor, save the current executive state and processed data, transmit the data to the processor to be switched thereto through a PCIe channel, and reconstruct the executive state. This process takes a lot of time and can take more than 20% of the total time length for running the procedure. Second, when the system switches form the CPU to the FPGA for running the procedure, the CPU has to be stopped and when the system switches form the FPGA to the CPU for running the procedure, the FPGA has to be stopped. This involves frequent control steps and thus is complicated and inconvenient as compared to running the entire traversal procedure in a single processor.

FPGA-based graph structure implementation pattern is about running the entire graph computing process in the same design structure of an FPGA, and eliminates consumption caused by CPU-FPGA data transmission and state reconstructing that are unavoidable during graph computing in a CPU-FPGA heterogeneous design. However, this structure has the following defects. First, without a structure designed with comprehensive consideration to respective executive properties of different stages along graph computing, it is impossible to leverage the properties of the processor and the graph algorithm to in turn optimize graph computing. Second, to meet the demand of large number of threads required by graph computing, the graph computing module has numerous parallelism units, and during graph computing, the operation about low degree of parallelism tends to be affected by the long-tail effect due to poor load balance across the numerous parallelism units.

SUMMARY

According to an aspect of the present disclosure, there is an FPGA-based graph data processing method and a system thereof. In the prior art, a CPU-FPGA heterogeneous graph system runs graph traversals across two processors, wherein a CPU manages the traversal stage with the low degree of parallelism and an FPGA manages the traversal stage with the high degree of parallelism. During switch between the two processors, the procedure running in the current processor has to be stopped, and the current executive state and data to be processed are saved, after which the data are transferred through a PCIe channel, and the executive state is reconstructed in the target processor. The entire process requires complicated control, difficult operation and a huge time cost. Ob the other hand, an FPGA-based graph system regards the whole process of graph traversals as a uniform execution process, and fails to leverage the executive properties of graph traversal. Thus, in the processor having a large amount of parallelism units, due to differences in the quantity of parallelism tasks during graph traversal, performance loss related to load imbalance and thread synchronization tends to happen. The present disclosure provides an FPGA-based small-world analyzing and scheduling method that completely eliminates defects seen in a CPU-FPGA heterogeneous graph system by saving the costs that are otherwise required by switch between heterogeneous processors and state reconstructing, and leverages the programmability of the FPGA as well as the executive properties of graph traversals to achieve module-specific operations in the FPGA, thereby maximizing optimization of the graph traversal algorithm.

In some embodiments, an FPGA-based graph data processing method, the method is for executing graph traversals on a graph having characteristics of a small-world network. The method executes the graph traversals using a first processor and a second processor that is in communicative connection with the first processor, wherein the first processor is a CPU and the second processor is an FPGA, wherein the first processor sends graph data to be traversed to the second processor, and the first processor obtains result data of the graph traversals from the second processor for result output after the second processor has completed the graph traversals of the graph data by executing level traversals, and the second processor (200) includes a sparsity processing module (210) and a density processing module (220), which respectively use on-chip logical resources in different areas of the second processor (200), the density processing module (220) has a higher degree of parallelism than the sparsity processing module (210), the sparsity processing module (210) is configured to operate in a beginning stage and/or an ending stage of the graph traversals where parallelism is low, and the density processing module (220) is configured to operate in the intermediate stage of the graph traversals where parallelism is high.

In some embodiments, boundaries between the low-parallelism beginning stage, the high-parallelism intermediate stage and the low-parallelism ending stage are determined using at least one of the following manners: during the graph traversals in the beginning stage, when a ratio between a total out-degree of nodes of at least one traversal iteration and a total number of nodes of that traversal is greater than or equal to 10, determine that that traversal iteration is an end of the beginning stage, and the next traversal iteration to that traversal iteration is a start of the intermediate stage; and during the graph traversals in the intermediate stage, when a ration between a total number of nodes of certain traversal and a total number of nodes of a next traversal to the certain traversal iteration is greater than or equal to 10, determine that that certain traversal is an end of the intermediate stage, and the next traversal iteration is a start of the ending stage; during the graph traversals in the beginning stage, when a ration between a total out-degree of nodes of at least one traversal iteration and a total number of nodes of the graph data is greater than or equal to a first preset threshold, determine that that traversal iteration is an end of the beginning stage, and the next traversal iteration to that traversal iteration is a start of the intermediate stage; and during the graph traversals in the intermediate stage, when a ratio between a total out-degree of nodes of at least one traversal iteration and a total number of nodes of the graph data is smaller than the first preset threshold, determine that that traversal iteration is an end of the intermediate stage, and the next traversal iteration to that traversal iteration is a start of the ending stage; and during the graph traversals in the beginning stage, when a ration between a total number of nodes of at least one traversal iteration and a total number of nodes of the graph data is greater than or equal to a second preset threshold, determine that that traversal iteration is an end of the beginning stage, and the next traversal iteration to that traversal iteration is a start of the intermediate stage; and during the graph traversals in the intermediate stage, when a ratio between a total number of nodes of at least one traversal iteration and a total number of nodes of the graph data is smaller than or equal to a third preset threshold, determine that that traversal iteration is an end of the intermediate stage, and the next traversal iteration to that traversal iteration is a start of the ending stage.

In some embodiments, before the second processor executes the graph traversals, the first processor first programs an algorithmic logic for the graph traversals to be executed into a logic circuit of the second processor, and then transmits the graph data to be traversed into a global memory of the second processor, and the sparsity processing module takes a selected initial node as an origin for division to divide the graph data in the global memory into plural data blocks using a heuristic algorithm, and then selects a data block containing the initial node from the plural data blocks and transmits the data block containing the initial node to an on-chip memory of the second processor.

In some embodiments, the sparsity processing module is configured to: determine an initial node of the traversals based on the data block containing the initial node in the on-chip memory; execute the graph traversals in the beginning stage from the initial node; and/or analyze and identify in which stage the graph traversals are in while executing the graph traversals, and when the graph traversals are in the low-parallelism beginning stage, proceed with the graph traversals in the sparsity processing module, and when the graph traversals enter the high-parallelism intermediate stage, stop executing the graph traversals, save a first executive state and the data as they are at the stopping moment, and then require the density processing module to execute the graph traversals after the data are saved.

In some embodiments, the density processing module is configured to: acquire the first executive state and the data saved by the sparsity processing module and reconstruct the first executive state of the graph traversals according thereto; when the first executive state of the graph traversals has been reconstructed, execute the graph traversals based on the data saved by the sparsity processing module; and/or analyze and identify in which stage the graph traversals are in while executing the graph traversals, and when the graph traversals are in the high-parallelism intermediate stage, proceed with the graph traversals in the density processing module, and when the graph traversals enter the low-parallelism ending stage, stop executing the graph traversals, save a second executive state and the data as they are at the stopping moment, and then require the sparsity processing module to execute the graph traversals after the data are saved.

In some embodiments, the sparsity processing module is further configured to: acquire the second executive state and the data saved by the density processing module and reconstruct the second executive state according thereto; when the second executive state has been reconstructed, execute the graph traversals based on the data saved by the density processing module; and analyze and identify whether the graph traversals have been completed while executing the graph traversals, and when the graph traversals have not been completed, proceed with the graph traversals, and when the graph traversals have been completed, process an acquired executive result so as to obtain result data of the graph traversals, and write the result data into the global memory.

In some embodiments, the step of analyzing and identifying whether the graph traversals have been completed includes: when the nodes adjacent to the currently traversed node have all been marked as traversed, comparing the nodes of the graph with the nodes that have been traversed, and where all the nodes are confirmed as traversed, determining that the graph traversal is over, and where there is still a node not traversed, determining that there is a subgraph that has not been traversed, and analyzing the data block in which there is the node that has not been traversed and transmitting the data block into the on-chip memory, so as to initiate the graph traversal in the subgraph by means of initial node sampling.

In some embodiments, the method further includes: building an executive-state-analyzing module in the second processor, in which, the executive-state-analyzing module is configured to: determine the data block required by the sparsity processing module and/or the density processing module in the successive graph traversal through analyzing and identifying an executive state for which the sparsity processing module and/or the density processing module executes the graph traversals, and transmit that required data block to the on-chip memory before the next traversal iteration.

In some embodiments, an FPGA-based graph traversal system, the system is used for executing graph traversals on a graph having characteristics of a small world network, the system includes a first processor and a second processor that is in communicative connection with the first processor, wherein the first processor is a CPU and the second processor is an FPGA, wherein the first processor sends graph data to be traversed to the second processor, and the first processor obtains result data of the graph traversals from the second processor for result output after the second processor has completed the graph traversals of the graph data by executing level traversals, and the second processor includes a sparsity processing module and a density processing module, which respectively use on-chip logical resources in different areas of the second processor, the density processing module has a higher degree of parallelism than the sparsity processing module, the sparsity processing module is configured to operate in a beginning stage and/or an ending stage of the graph traversals where parallelism is low, and the density processing module is configured to operate in the intermediate stage of the graph traversals where parallelism is high.

In some embodiments, boundaries between the low-parallelism beginning stage, the high-parallelism intermediate stage and the low-parallelism ending stage are determined using at least one of the following manners: during the graph traversals in the beginning stage, when a ratio between a total out-degree of nodes of at least one traversal iteration and a total number of nodes of that traversal is greater than or equal to 10, determine that that traversal iteration is an end of the beginning stage, and the next traversal iteration to that traversal iteration is a start of the intermediate stage; and during the graph traversals in the intermediate stage, when a ration between a total number of nodes of certain traversal and a total number of nodes of a next traversal to a certain traversal iteration is greater than or equal to 10, determine that that certain traversal is an end of the intermediate stage, and the next traversal iteration is a start of the ending stage; during the graph traversals in the beginning stage, when a ration between a total out-degree of nodes of at least one traversal iteration and a total number of nodes of the graph data is greater than or equal to a first preset threshold, determine that that traversal iteration is an end of the beginning stage, and the next traversal iteration to that traversal iteration is a start of the intermediate stage; and during the graph traversals in the intermediate stage, when a ratio between a total out-degree of nodes of at least one traversal iteration and a total number of nodes of the graph data is smaller than the first preset threshold, determine that that traversal iteration is an end of the intermediate stage, and the next traversal iteration to that traversal iteration is a start of the ending stage; and during the graph traversals in the beginning stage, when a ration between a total number of nodes of at least one traversal iteration and a total number of nodes of the graph data is greater than or equal to a second preset threshold, determine that that traversal iteration is an end of the beginning stage, and the next traversal iteration to that traversal iteration is a start of the intermediate stage; and during the graph traversals in the intermediate stage, when a ratio between a total number of nodes of at least one traversal iteration and a total number of nodes of the graph data is smaller than or equal to a third preset threshold, determine that that traversal iteration is an end of the intermediate stage, and the next traversal iteration to that traversal iteration is a start of the ending stage.

DETAILED DESCRIPTION OF THE INVENTION

The following description, in conjunction with the accompanying drawings and some embodiments, is set forth as below to illustrate the present disclosure.

It is noted that, for easy understanding, like features bear similar labels in the attached figures as much as possible.

As used throughout this application, the term "may" is of permitted meaning (i.e., possibly) but not compulsory meaning (i.e., essentially). Similarly, the terms "comprising", "including" and "consisting" mean "comprising but not limited to".

The phrases "at least one", "one or more" and "and/or" are for open expression and shall cover both connected and separate operations. For example, each of "at least one of A, B and C", "at least one of A, B or C", "one or more of A, B and C", "A, B or C" and "A, B and/or C" may refer to A solely, B solely, C solely, A and B, A and C, B and C or A, B and C.

The term "a" or "an" article refers to one or more articles. As such, the terms "a" (or "an"), "one or more" and "at least one" are interchangeable herein. It is also to be noted that the term "comprising", "including" and "having" used herein are interchangeable.

As used herein, the term "automatic" and its variations refer to a process or operation that is done without physical, manual input. However, where the input is received before the process or operation is performed, the process or operation may be automatic, even if the process or operation is performed with physical or non-physical manual input. If such input affects how the process or operation is performed, the manual input is considered physical. Any manual input that enables performance of the process or operation is not considered "physical".

First, terms used herein are defined as below:

An on-chip memory may refer to a BRAM, i.e. a Block RAM, i.e. a block random access memory.

A global memory may refer to a DRAM, i.e. a Dynamic RAM, i.e. a dynamic random access memory.

According to one aspect of the present disclosure, what is disclosed is an FPGA-based graph data processing method, or a graph data processing method, or a method for processing graph data. The method may be realized using the system of the present disclosure and/or other substitute components. Without causing conflicts or inconsistence, the entire and/or partial content of other embodiments may be added to the present embodiment as supplements.

Figure 1:
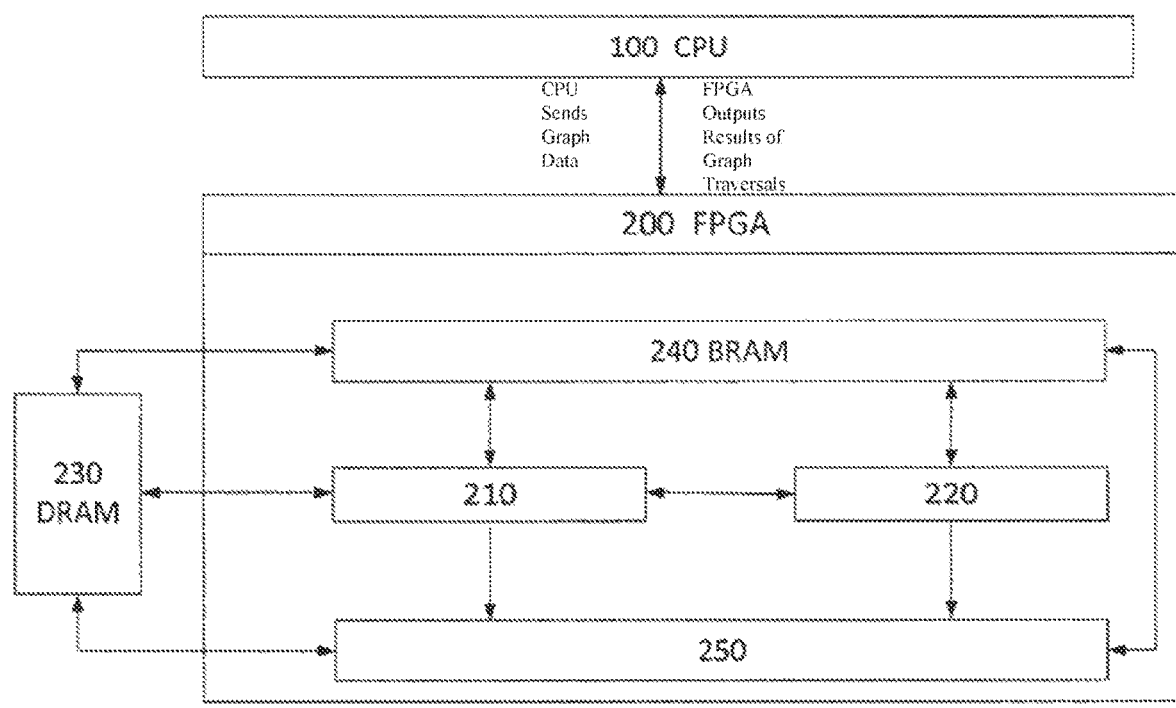
FIG. 1 is a module block diagram of the system according to some embodiments of the present disclosure.

According to some embodiments, referring to FIG. 1, the method can be used for executing graph traversals on a graph having characteristics of a small-world network. In an embodiment, the method may include: using a first processor 100 and a second processor 200 that is in communicative connection with the first processor 100. The method may include: executing the graph traversals using a first processor 100 and/or a second processor 200 that is in communicative connection with the first processor 100. The first processor 100 can be a CPU. The second processor 200 can be an FPGA. The first processor 100 sends graph data to be traversed to the second processor 200. The first processor 100 obtains result data of the graph traversals from the second processor 200 for result output after the second processor 200 has completed the graph traversals of the graph data by executing level traversals. In an embodiment, the second processor 200 may include a sparsity processing module 210 and a density processing module 220.

In some embodiments, the sparsity processing module 210 and the density processing module 220 may respectively use on-chip logical resources in different areas of the second processor 200. The density processing module 220 may use more on-chip logical resources than the sparsity processing module 210. The density processing module 220 may have a higher degree of parallelism than the sparsity processing module 210. The density processing module 220 uses more on-chip logical resources than the sparsity processing module 210, so that the density processing module 220 has a higher degree of parallelism as compared to the sparsity processing module 210. The sparsity processing module 210 and the density processing module 220 may be separated from each other as they are positioned on the chip. The sparsity processing module 210 and the density processing module 220 have no common logic circuits. A first amount of first arithmetic-logic units in the sparsity processing module 210 for graph traversals may be smaller than a second amount of second arithmetic-logic units in the density processing module 220 for graph traversals. The sparsity processing module 210 may execute graph traversals in the beginning stage and/or ending stage of a low-parallelism nature. The density processing module 220 may execute graph traversals in the intermediate stage of a high-parallelism nature. In an embodiment, the terms "first" and "second" with respect to the first arithmetic-logic unit and the second arithmetic-logic unit are merely for easy differentiation of whether the referred arithmetic-logic units belong to the sparsity processing module or the density processing module. The different first arithmetic-logic units may have their respective logic gate types and/or logic gate amounts. In an embodiment, there is a difference between the first amount and the second amount that is at least an order of magnitude. For example, the sparsity processing module 210 may include a processing module that has 100 arithmetic-logic units, and the density processing module 220 may include 1000 to 3000 arithmetic-logic units. As another example, the sparsity processing module 210 may include 20 arithmetic-logic units, and the density processing module 220 may include 200 to 500 arithmetic-logic units. As yet another example, the sparsity processing module 210 may include 40 arithmetic-logic units, and the density processing module 220 may include 600 to 1000 arithmetic-logic units. In an embodiment, the first processor 100 may be, for example, at least one of Intel Xeon Platinum 8173M, Intel Xeon E5-2679, Intel Core i7-5960X, AMD Ryzen 5 PRO 1500, and AMD Ryzen 7 1700. In an embodiment, the second processor may be, for example, at least one of Xilinx Spartan-7, Xilinx Spartan-6, Xilinx Zynq-7000, Xilinx Artix-7, Xilinx Virtex-7, Xilinx Kintex UltraScale, Xilinx Virtex UltraScale, Altera Stratix 10 and Altera Cyclone V. In an embodiment, the first processor and the second processor are in communicative connection to each other through a PCI-e channel. In an embodiment, the sparsity processing module 210 may be of a structure that is suitable for low-parallelism graph traversal, catering for the beginning and ending stages of graph traversals where the degree of parallelism is low. In the beginning stage of graph traversal, the sparsity processing module 210 may pre-process the data blocks to determine the initial node of traversal. In an embodiment, the density processing module 220 may be a processing module that is suitable for high-parallelism graph traversal, catering for the high degree of parallelism for graph traversals occurring in the intermediate stage. In the density processing module 220, a first executive state saved by the sparsity processing module 210 is reconstructed, and then high-parallelism graph traversals are executed. With this design, the present disclosure executes graph traversals in two parts using the two processing modules designed in an FPGA, respectively. The second processor 200 may be a programmable logic gate array, providing users with adequate logic gate units and resources. By combining the logic design with the executive characteristics of graph traversal, the entire graph traversal process can be handled by two modules each caring of parts of the two different degrees of parallelism, thereby enhancing the efficiency of graph traversal. In an embodiment, before the second processor 200 executes the graph traversal, a graph traversal execution logic may be defined by the user and programmed into the logic circuit of the second processor 200. With this, the user can run the user-defined graph traversal execution algorithm without paying attention to the complicated procedures of scheduling data storage and transmission, initializing traversal, and controlling traversal. In an embodiment, the first processor 100 may be a CPU and/or a general-purpose processor built on an FPGA. In an embodiment, the sparsity processing module 210 may be a processor specialized for graph data processing and/or a general-purpose processor built on an FPGA.

In some embodiments, the small-world network characteristics refer to properties of a network graph that has a relatively short average path length and a relatively large clustering coefficient. In the real world, many networks have these small-world network characteristics, such as traffic networks, brain neural networks, social networks and food chains. It is thus clear that nature graphs share properties with small-world networks, and have their diameters limited to a certain numeral range. Therefore, traversals for nature graphs has a distinctive pattern that an execution process of low degree of parallelism turns to an execution process of high degree of parallelism high and then the execution process of high degree of parallelism turns to the execution process of low degree of parallelism, therefore the entire graph traversal process shows two clear features. The first is the low-parallelism execution process in the beginning and/or ending stage, and the second is the very high-parallelism execution process in the intermediate stage. In view of this, the present disclosure designs two respective dedicated modules in an FPGA especially for the low-parallelism and high-parallelism executive properties to deal with the corresponding traversal stages, respectively, so as to make good use of the properties of small-world networks. In other words, since node degrees in a nature graph are distributed following the power law, hence there are large number of nodes having a very small degree, taking up a majority of all nodes, the selected initial node for traversals is very likely a node having a very small degree, and its adjacent nodes are very probably ones having a very small degree. Due to this fact, during traversal, the degree of parallelism in the beginning stage is very low, and in the intermediate stage, with the development of traversal iteration, the number of nodes for iteration increases exponentially. Since the diameter of a nature graph is limited to a certain range, after certain times of iteration and nodes having large degree are traversed, thus the degree of parallelism of the traversal in the intermediate stage is very high. In the latter part of traversal, since the large-degree nodes have been traversed, the nodes to be traversed at this stage are of low degrees. Afterward, with the progress of traversal iteration, the degree of parallelism becomes lower and lower. To sum up, the entire graph traversal process has the degree of parallelism low at two ends and high in the middle part.

Figure 3:
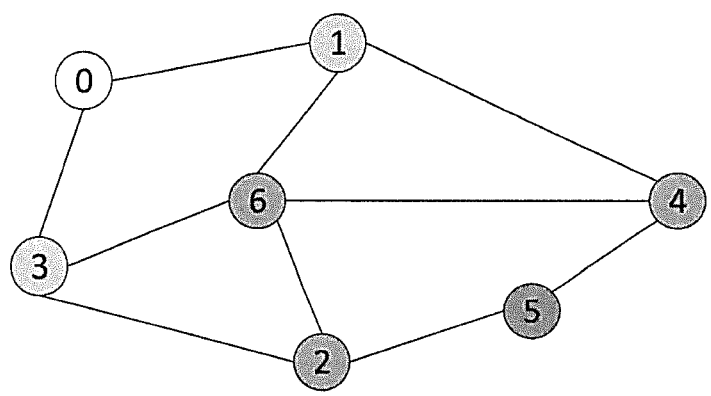
FIG. 3 explains a BFS (Breadth First Search) graph traversal process based on a graph type data structure according to some embodiments of the present disclosure.
Figure 4:
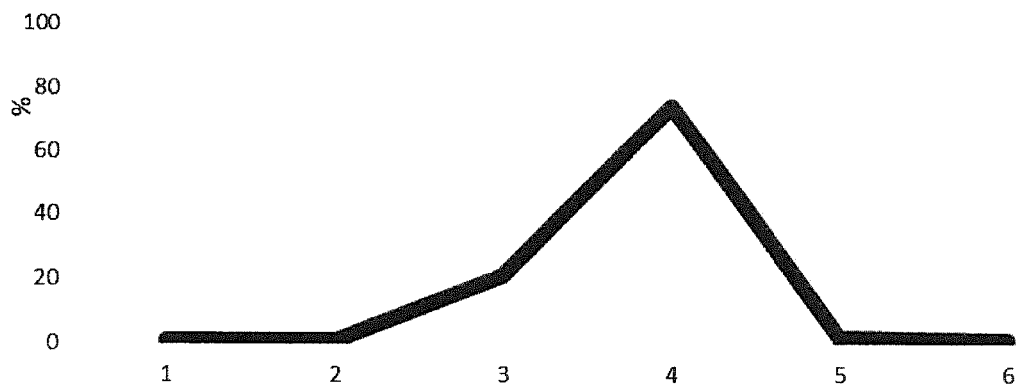
FIG. 4 is a graph showing the proportions of the numbers of nodes traversed in different iteration levels of BFS traversals against the total number of nodes in a social-network graph structure.

According to an embodiment of the present disclosure, as long as the graph traversal process satisfies the properties of level traversal, it exhibits transitions between high parallelism and low parallelism. In an embodiment, the term "level traversal" may refer to a process where the nodes in a graph are accessed level by level. For example, the process may begin from the initial node, at first the initial nodes of the first level are accessed, and the nodes in the second level and third level are accessed successively, and so on. Such a process of accessing nodes in a graph level by level is level traversal. With the execution of traversal iteration, the out-degree of every node added is greater than or equal to 1, and the number of the nodes to be traversed in the next iteration to the current traversal iteration is greater than the number of the nodes traversed in the current iteration, which means the degree of parallelism for traversals increases. If the node of the new traversal is entered from a node of large out-degree, the degree of parallelism will be very high. For example, breadth-first search and shortest path search have the characteristics of level traversal. The term "breadth-first search" is also known as BFS and the term "shortest path search" is also known as SSSP. Referring to FIG. 3, a simple example is depicted to explain a traversal process for a graph data structure. FIG. 3 is a schematic diagram explains a graph traversal process using a breadth-first approach based on a graph type data structure. The breadth-first approach is BFS traversal. The graph data structure is composed of nodes and edges, wherein two nodes are connected by an edge. There are two types of edges. The first type is directed edges that form a directed graph, and the second type is undirected edges that form an undirected graph. The following description is made to an undirected graph as an example. The graph shown in FIG. 3 has 7 nodes in total and when the BFS traversal starts, Node 0 is taken as the initial node for BFS traversal to start the BFS traversal. In the process, Nodes 1 and 3 are first traversed, then Nodes 2, 6 and 4 are traversed, and Node 5 is traversed at the last. Throughout the entire traversal process, nodes traversed in different traversal iteration are marked in different colors. Throughout the entire traversal process, the numbers of nodes traversed in respective iterations are 1, 2, 3, and 1. This shows that the number of nodes traversed in the first iteration and the last iteration of the entire traversal process is the smallest while the number of nodes of the traversal iteration in the intermediate stage is the largest, and it takes up a great proportion in the number of total nodes compared to the number of nodes in the first and last iteration. In an embodiment, in a case that traversals are conducted in an SSSP approach, the traversal begins at a source point, and the distance from the nodes of each level to the source point is calculated according to the process of level traversal. The calculation for each node is not related in the current iteration, and may be completely parallel. Thus, transitions between high parallelism and low parallelism appear throughout the entire traversal process. In a nature graph, such as a social network, since the nature graph has the properties of a small-world network, the nodes are distributed following the power law. Besides, since the theory of six degrees of separation is true in a social network, a social-network graph has a diameter in a certain numeral range. Under the foregoing conditions, as shown in FIG. 4, which is a graph showing the proportions of the numbers of nodes traversed in the iteration of each level against the total number of nodes in a BFS traversal of a social-network graph, wherein the horizontal axis represents the sequence of traversal iterations and the vertical axis represents the number of nodes traversed in the iteration of each level against the total number of the nodes in the graph, the social network has a diameter of 6, so the total number of traversal iteration is 6. Due to the small-world network characteristics, the nodes traversed at the beginning takes only a small proportion in the entire traversal process. As shown in FIG. 4, the numbers of nodes traversed in the first iteration and the second iteration both take a small proportion. However, when the traversal enters the third iteration, the nodes traversed are much more and take a proportion much greater than those of the first and second iterations. In the fourth iteration, the number of nodes traversed forms a peak throughout the entire traversal process, representing a proportion higher than 60% of the number of traversed nodes. It is thus clear that the intermediate stage of the traversal is high-parallelism stage in terms of the number of traversed nodes. The third iteration and the fourth iteration characterize this stage of traversal, having the highest degree of parallelism. Then the traversal proceeds with the fifth iteration and the sixth iteration. In the fifth iteration, the number of nodes traversed decreases sharply, and in the sixth iteration the number of nodes traversed continues to decrease until the end of the traversal process. It is thus found that in terms of the number of nodes traversed, the late part of the traversal is similar to the beginning of the traversal, and the proportion of nodes traversed is much smaller than that of the high-parallelism stage, so the parallelism is low here. As shown in FIG. 4, in the beginning stage and ending stage of the traversal process of a natural graph, a small number of nodes are traversed and the degree of parallelism is low. In the intermediate stage of the traversal, a large number of nodes are traversed and the degree of parallelism is quite high. This is the trait of a graph having the small-world network characteristics that can be shown in a traversal process.

According to an embodiment, boundaries between the low-parallelism beginning stage, the high-parallelism intermediate stage and the low-parallelism ending stage may be determined by using the following manner: during the graph traversals in the beginning stage, when a ratio between a total out-degree of nodes of at least one traversal iteration and a total number of nodes of that traversal is greater than or equal to 10, determine that that traversal iteration is an end of the beginning stage, and the next traversal iteration to that traversal iteration is a start of the intermediate stage; and during the graph traversals in the intermediate stage, when a ration between a total number of nodes of certain traversal and a total number of nodes of a next traversal to the certain traversal is greater than or equal to 10, determine that that certain traversal is an end of the intermediate stage, and the next traversal iteration is a start of the ending stage.

According to an embodiment, boundaries between the low-parallelism beginning stage, the high-parallelism intermediate stage and the low-parallelism ending stage can be determined by using the following manner: during the graph traversals in the beginning stage, when a ration between a total out-degree of nodes of at least one traversal iteration and a total number of nodes of the graph data is greater than or equal to a first preset threshold, determine that that traversal iteration is an end of the beginning stage, and the next traversal iteration to that traversal iteration is a start of the intermediate stage; and during the graph traversals in the intermediate stage, when a ratio between a total out-degree of nodes of at least one traversal iteration and a total number of nodes of the graph data is smaller than the first preset threshold, determine that that traversal iteration is an end of the intermediate stage, and the next traversal iteration to that traversal iteration is a start of the ending stage. For example, during the beginning stage of the graph traversal, when the high- or low-parallelism module conducts determination according to executive properties during execution. Na represents the total out-degree of nodes in one iteration, and Nt represents the total number of nodes of the graph data, while a first preset threshold SD is preset. During the execution of iteration, if the feature calculation of execution generates the value Na/Nt<SD, the traversal is run by the sparsity processing module. If the feature calculation of execution generates the value Na/Nt?SD, the traversal is run by the density processing module. In an embodiment, the first preset threshold may be 20% to 50%.

According to an embodiment, boundaries between the low-parallelism beginning stage, the high-parallelism intermediate stage and the low-parallelism ending stage can be determined by using the following manner: during the graph traversals in the beginning stage, when a ration between a total number of nodes of at least one traversal iteration and a total number of nodes of the graph data is greater than or equal to a second preset threshold, determine that that traversal iteration is an end of the beginning stage, and the next traversal iteration to that traversal iteration is a start of the intermediate stage; and during the graph traversals in the intermediate stage, when a ratio between a total number of nodes of at least one traversal iteration and a total number of nodes of the graph data is smaller than or equal to a third preset threshold, determine that that traversal iteration is an end of the intermediate stage, and the next traversal iteration to that traversal iteration is a start of the ending stage. In an embodiment, the second preset threshold and/or the third preset threshold may be defined by the user. In an embodiment, the term "at least one time" may be the case where one, two or more than two times appear, which can be defined by the user. In an embodiment, the second preset threshold may be 5% to 10% and the third preset threshold may be 5% to 10%. In an embodiment, the second preset threshold may be smaller than or equal to the third preset threshold. According to an embodiment, the boundaries between the low-parallelism beginning stage, the high-parallelism intermediate stage and the low-parallelism ending stage may be determined using at least one of the above three optional modes. When two of the above three optional modes are used to determine the boundaries, the final determination of the boundaries are only established when the results satisfy the requirements of both of the two selected modes. When all of the three optional modes are used to determine the boundaries, the final determination of the boundaries are only established when the results satisfy the requirements of all of the three modes. The boundaries may include the end of the beginning stage, the start of the intermediate stage, the end of the intermediate stage, and the start of the ending stage.

According to an embodiment, before the second processor 200 executes the graph traversals, the first processor 100 may first program an algorithmic logic for the graph traversals to be executed into a logic circuit of the second processor 200, and then transmits the graph data to be traversed into a global memory 230 of the second processor 200. The sparsity processing module 210 may take a selected initial node as an origin for division to divide the graph data in the global memory 230 into plural data blocks using a heuristic algorithm, and then selects a data block containing the initial node from the plural data blocks and transmits the data block containing the initial node to an on-chip memory 240 of the second processor 200.

According to an embodiment, the sparsity processing module 210 may be configured to: determine an initial node of the traversals based on the data block containing the initial node in the on-chip memory 240; execute the graph traversals in the beginning stage from the initial node; and/or analyze and identify in which stage the graph traversals are in while executing the graph traversals, and when the graph traversals are in the low-parallelism beginning stage, proceed with the graph traversals in the sparsity processing module 210, and when the graph traversals enter the high-parallelism intermediate stage, stop executing the graph traversals, save a first executive state and the data as they are at the stopping moment, and then require the density processing module 220 to execute the graph traversals after the data are saved.

According to some embodiments, the density processing module 220 may be configured to: acquire the first executive state and the data saved by the sparsity processing module 210 and reconstruct the first executive state of the graph traversals according thereto; when the first executive state of the graph traversals has been reconstructed, execute the graph traversals based on the data saved by the sparsity processing module 210; and/or analyze and identify in which stage the graph traversals are in while executing the graph traversals, and when the graph traversals are in the high-parallelism intermediate stage, proceed with the graph traversals in the density processing module 220, and when the graph traversals enter the low-parallelism ending stage, stop executing the graph traversals, save a second executive state and the data as they are at the stopping moment, and then require the sparsity processing module 210 to execute the graph traversals after the data are saved.

According to some embodiments, the sparsity processing module 210 may be further configured to: acquire the second executive state and the data saved by the density processing module 220 and reconstruct the second executive state according thereto; when the second executive state has been reconstructed, execute the graph traversals based on the data saved by the density processing module 220; and analyze and identify whether the graph traversals have been completed while executing the graph traversals, and when the graph traversals have not been completed, proceed with the graph traversals, and when the graph traversals have been completed, process an acquired executive result so as to obtain result data of the graph traversals, and write the result data into the global memory 230.

According to some embodiments, the step of analyzing and identifying whether the graph traversals have been completed may include: when the nodes adjacent to the currently traversed node have all been marked as traversed, comparing the nodes of the graph with the nodes that have been traversed, and where all the nodes are confirmed as traversed, determining that the graph traversal is over, and where there is still a node not traversed, determining that there is a subgraph that has not been traversed, and analyzing the data block in which there is the node that has not been traversed and transmitting the data block into the on-chip memory 240, so as to initiate the graph traversal in the subgraph by means of initial node sampling.

According to an embodiment, the method of the present disclosure may include at least one of the following steps: programming the graph traversal algorithmic logic to be executed into the logic circuit of the second processor 200, and transmitting the graph data to be traversed into the global memory 230 of the second processor 200; using a heuristic algorithm to divide the graph data against an initial node selected by the user into plural data blocks, and transmitting the data block containing the initial node to the on-chip memory 240 of the second processor 200; and pre-processing the data, and converting the CSC compressed data into data of a graph adjacency list. The term CSC refers to "compressed spare column" format, which is a storage format using a sparse matrix.

In some embodiments, the beginning stage of the graph traversal is executed by the sparsity processing module 210. In the graph traversal process, the sparsity processing module 210 determines whether the graph traversal process is now in its low-parallelism beginning stage. If yes, the sparsity processing module 210 continues to execute the graph traversal process. If no, the sparsity processing module 210 determines that the graph traversal process has entered the high-parallelism intermediate stage, and at this time the sparsity processing module 210 stops running the graph traversal, and saves the first executive state and data the graph traversal currently have. Then the density processing module 220 takes over to run the graph traversal process instead. The first executive state and data saved when the sparsity processing module 210 stops are transmitted to the density processing module 220, and the first executive state of the graph traversal is reconstructed in the density processing module 220, as the pre-processing of the density processing module 220. In an embodiment, the density processing module 220 acquires data blocks pre-transmitted when the sparsity processing module 210 runs the traversal, so that once the state of the graph traversal is reconstructed, the traversal can be resumed immediately. The intermediate stage of the graph traversal is run in the density processing module 220. In the graph traversal process, the density processing module 220 determines whether the graph traversal process is now in its high-parallelism intermediate stage. If yes, the density processing module 220 continues to execute the graph traversal process. If no, the density processing module 220 determines that the graph traversal process has entered its low-parallelism ending stage, and at this time the density processing module 220 stops running the graph traversal, and saves the second executive state and data the graph traversal currently have. Then the sparsity processing module 210 takes over to run the graph traversal process instead. In an embodiment, the ending stage of the graph traversal is executed by the sparsity processing module 210. The sparsity processing module 210 determined whether the traversal has ended. If no, it continues to run the graph traversal process. If yes, the sparsity processing module 210 processes the acquired executive results into result data, and writes the data into the global memory 230. In an embodiment, the first processor 100 acquires the result data of the graph traversal from the global memory 230, and outputs the result according to the default.

According to another embodiment, the method of the present disclosure may include at least one of the following steps: as system initialization, starting system building on the second processor 200 based on the graph computing method of the second processor 200, translating the graph computing method of the second processor 200 into binary codes executable to the second processor 200, and programming the binary codes into the second processor 200; programming the graph traversal algorithmic logic to be executed into the execution logic of the second processor 200, so as to determine the traversal process defined by the graph traversal algorithm; transmitting the graph data to be traversed into the global memory 230 of the second processor 200; using a heuristic sampling method to select the data block to be accessed in the next iteration and transmitting the data block into the on-chip memory 240 of the second processor 200, pre-processing the graph data, and converting the CSC data into a graph adjacency list, wherein since the nodes and edges having connections are typically not far away from each other, the data block to be accessed in the next iteration is selected by selectively reading the data area adjacent to the data currently processed and then transmitted to the on-chip memory 240 of the second processor 200; beginning the traversal at the sparsity processing module 210, the sparsity processing module 210 determining that it is now the beginning stage of the graph traversal, and pre-processing the data to be traversed, determining the initial node for the traversal, and the arithmetic-logic unit executing the graph traversals process; using a dispatcher to analyze whether the traversal process is now in the beginning low-parallelism execution stage, if yes, running the graph traversal algorithm in the calculating unit, wherein if the total out-degree of the nodes traversed is very high, it means that a lot of nodes will be traversed in the next iteration, and that the traversal starts to enter the high-parallelism stage, so switch between the modules is required for subsequent iterations; running the executive-state-analyzing module 250 to acquire the executive condition of the graph data, during the traversal process, identifying the data block to be processed subsequently in advance by analyzing the structure adjacent to the current graph data and using a greedy strategy, then inputting the data block into the on-chip memory 240 of the second processor 200 before the traversal process is resumed, so as to quickly run the subsequent traversal without waiting for data transmission, wherein since the resources of the on-chip memory 240 of the second processor 200 are limited, only the data to be traversed are sent to the on-chip memory 240; executing subsequent processing on the acquired executive result according to the requirements set by the user, and then packing the result into CSC data and outputting the CSC data to the global memory 230, wherein the subsequent processing may be, for example, deleting designated nodes and edges, and building a tree structure; the traversal process entering the high-parallelism stage, when the dispatcher sub-module detects the total out-degree of nodes of the current traversal iteration, when there is an order of magnitude difference between the node total out-degree and the total number of the nodes of the current iteration, determining that the beginning stage of the graph traversal process has ended and the graph traversal process starts to enter the high-parallelism stage, saving the current first executive state and data, activating the density processing module 220 to run graph traversal, and transmitting the saved first executive state and data to the density processing module 220; having the density processing module 220 run graph traversal, transmitting the state and data saved when the sparsity processing module 210 stops to the density processing module 220, reconstructing the suspended first executive state, executing pre-processing of execution of the density processing module 220; once the executive state is built, the density processing module 220 using the data it received when the sparsity processing module 210 executes traversal to run subsequent traversal, which eliminates the need of identifying the data block to be traversed according to the existing nodes and saves time otherwise required by data transmission, during the intermediate stage, the dispatcher determining the executive condition of the high-parallelism stage, if the nodes adjacent to the nodes traversed in this the stage have basically been marked as traversed, and there is an order-of-magnitude difference between the number of nodes to be traversed in the next traversal iteration and the number of nodes traversed in this traversal, determining that the traversal process has entered the low-parallelism subsequent stage, and the density processing module 220 stopping running traversal, if the difference between the number of nodes traversed in this iteration and that of the next traversal is smaller than an order-of-magnitude one, determining that the traversal process is now still in the high-parallelism stage, and continuing traversal of this stage; executing subsequent processing on the acquired executive result according to the requirements set by the user, such as deleting designated nodes and edges, and building a tree structure, packing the processed executive result into CSC data, and outputting the data to the global memory 230; the traversal process entering the ending stage, executing module switch, when the dispatcher detects that the nodes adjacent to the nodes traversed in this the traversal iteration have most been marked as traversed, and there is an order-of-magnitude difference between the number of nodes to be traversed in the next traversal iteration and the number of nodes traversed in this traversal, determining that the traversal process has entered the low-parallelism ending stage, the traversal process entering the ending stage, the density processing module 220 stopping running, and maintaining executive state and data, saving the current second executive state and data, activating the sparsity processing module 210, transmitting the saved state and data to the sparsity processing module 210; having the sparsity processing module 210 run the ending stage of graph traversal, transmitting the state and data saved when the density processing module 220 stops to the sparsity processing module 210, reconstructing the suspended executive state, and executing pre-processing of the execution of the sparsity processing module 210; having the sparsity processing module 210 run graph traversal, determining whether the traversal has ended according to the state of traversal, if the nodes adjacent to the nodes traversed in this traversal have all been marked as traversed, and all the subgraphs have been traversed, determining that the traversal has ended, and if there is any adjacent node that has not been traversed, or any subgraph of the graph that has not been traversed, proceeding with the graph traversal process; using the dispatcher to determine whether traversal has ended, if there is any node adjacent to the nodes traversed in this iteration having not been traversed, proceeding with the ending stage of the graph traversal process, and if there is no adjacent nodes not traversed, checking whether there is any subgraph not traversed, if yes, using the heuristic sampling method to select nodes in subgraph and executing traversal on the subgraph; and executing subsequent processing on the acquired executive result according to the requirements set by the user, packing the processed result into CSC data, and outputting the data to the global memory 230.

According to an embodiment, the traversal dispatcher determines that the graph traversal process has entered the ending state. After one iteration, the traversal dispatcher checks whether there is any node adjacent to the nodes currently traversed having not been traversed. When all the adjacent nodes have been marked as traversed, the traversal dispatcher checks whether there is any subgraph having not been traversed. When nodes in all the data areas have been traversed, the traversal process is ended. In an embodiment, after the graph traversal algorithm is ended, the sparsity processing module 210 may execute subsequent operation to process the executive result data by compressing the executive result and transmitting it to the global memory 230. For outputting the graph traversal result, the first processor 100 acquires the data after execution of graph traversal, and outputs the result in an output device according to requirements for data outputting result. In an embodiment, since not all of the nodes in the graph are connected by edges to form interconnected paths, a graph is composed of subgraphs that are disconnected graphs. A subgraph may be a graph having a large number of nodes or a graph having a small number of nodes. In the graph traversal process, if a graph has a certain number of subgraphs that have very few nodes, it is important in the ending stage of traversal to take care of these subgraphs that are very likely to be missed for traversal due to node sampling. The subgraphs only having few nodes can be missed for traversal throughout the entire traversal process because of the selection of initial node. Therefore, even if all the adjacent nodes of the currently traversed node have all been marked as traversed, it does not prove for certain that traversal iteration of the graph has been completed. At this time, further analysis of the graph is required. For this reason, it is important to have a record about the data blocks that have never been traversed in the earlier traversal process. With such a record, when all the data blocks have been traversed and there is no nodes not traversed according to the record, it is proper to end the traversal process. If there is any node recorded as not traversed, traversal ending process has to be executed. The data block containing the node not traversed has to be analyzed, sent to the on-chip memory 240 of the second processor 200 for initial node sampling, and starting the graph traversal process in the corresponding subgraph.

According to an embodiment, all the arithmetic-logic units in the density processing module 220 are divided to form execution entries each containing a preset number of arithmetic-logic units. Thus, the density processing module 220 includes a certain number of execution entries, and the execution entries are each composed of a certain number of arithmetic-logic units. The density processing module 220 controls all of the execution entries, and every execution entry controls the arithmetic-logic units it contains.

According to some embodiments, the method may further include: building an executive-state-analyzing module 250 in the second processor 200. The executive-state-analyzing module 250 may be configured to: determine the data block required by the sparsity processing module 210 and/or the density processing module 220 in the successive graph traversal through analyzing and identifying an executive state for which the sparsity processing module 210 and/or the density processing module 220 executes the graph traversals, and transmit that required data block to the on-chip memory 240 before the next traversal iteration. With this configuration, the sparsity processing module 210 and/ or the density processing module 220 can quickly start the next traversal iteration in subsequent traversal. In an embodiment, determining the processing of the data block required by the sparsity processing module 210 and/or density processing module 220 in the later graph traversal process by analyzing the executive state for graph traversal executed by the sparsity processing module 210 and/or the density processing module 220 may include: the state analyzing module 250 analyzing the execution situation during operation, acquiring operating information, sending the information to an access controller, using a greedy strategy to analyze data blocks adjacent to the large-degree nodes, and selectively reading data areas adjacent to the data currently processed, so as to identify the data blocks required by the sparsity processing module 210 and/or the density processing module 220 in the later graph traversal process. Thus, during execution of graph traversal, the executive states of the sparsity processing module 210 and/or the density processing module 220 are analyzed to acquire the data block required by subsequent execution. Then the required data blocks are transmitted to the on-chip memory 240 of the second processor 200 from the global memory 230 in advance. In this way, the subsequent traversal iterations can be executed directly without waiting for data transmission, thereby speeding up execution of traversal. In an embodiment, the sparsity processing module 210, the density processing module 220 and the state analyzing module 250 of the present disclosure may all be hardware modules built on the FPGA.

Figure 2:
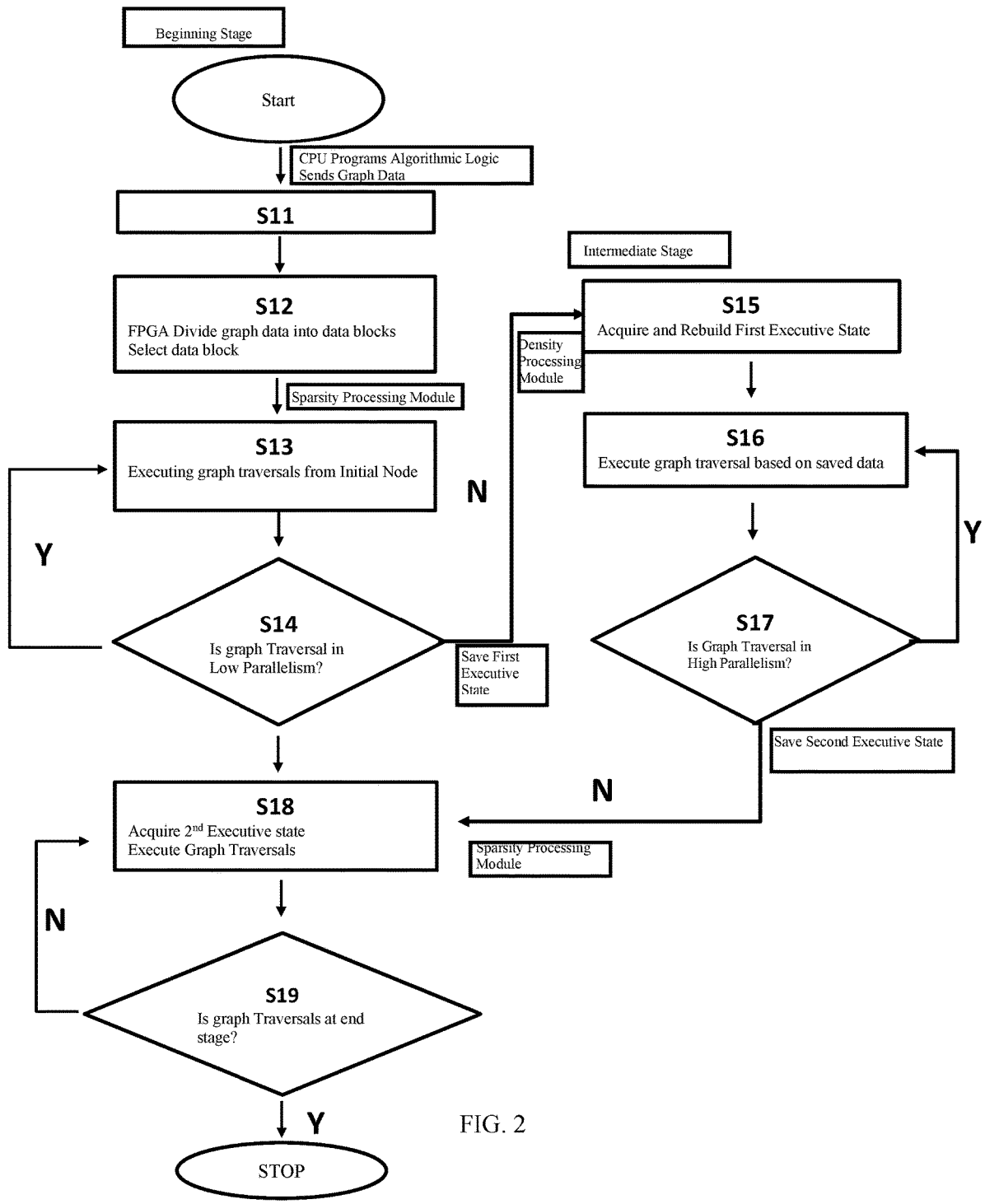
FIG. 2 is a flowchart of the method according to some embodiments of the present disclosure.

According to an embodiment, as shown in FIG. 2, the method may include the following steps:

Step S11: building a is system that executes graph traversal on a graph having the small-world network characteristics, and turning into Step S12, wherein the system may include: a first processor 100 and a second processor 200 in communicative connection with the first processor 100, in which the first processor 100 is a CPU, and the second processor 200 is an FPGA, and in which the second processor may include a sparsity processing module 210 and a density processing module 220, wherein the sparsity processing module 210 has a first amount of arithmetic-logic units for executing graph traversal while the density processing module 220 has a second amount of arithmetic-logic units for executing graph traversal and the first amount is smaller than the second amount;

Step S12: programming the graph traversal algorithmic logic to be executed into the logic circuit of the second processor 200, transmitting the graph data to be traversed into the global memory 230 of the second processor 200, using a heuristic algorithm to dividing the graph data into data blocks against an initial node selected by the user, transmitting the data block containing the initial node to the on-chip memory 240 of the second processor 200, and turning into Step S13;

Step S13: executing the beginning stage of graph traversal in the sparsity processing module 210, and executing Step S14 during execution;

Step S14: in the graph traversal process, having the sparsity processing module 210 determine whether the graph traversal process is now in the low-parallelism beginning stage, if yes, repeating Step 13, and continuing to execute the graph traversal process in the sparsity processing module 210, if no, determining that the graph traversal process has entered the high-parallelism intermediate stage, having the sparsity processing module 210 stop executing graph traversal, saving the first executive state and data of the current graph traversal, and turning into Step S15;

Step S15: transmitting the first executive state and data saved when the sparsity processing module 210 stops to the density processing module 220, reconstructing the suspended first executive state of graph traversal, executing pre-processing of execution of the density processing module 220, and turning into Step S16;

Step S16: executing the intermediate stage of graph traversal in the density processing module 220, and executing Step S17 during execution;

Step S17: in the graph traversal process, having the density processing module 220 determine whether the graph traversal process is now in its high-parallelism intermediate stage, if yes, repeating Step S16, and continuing to execute the graph traversal process in the density processing module 220, if no, determining that the graph traversal process has entered the low-parallelism ending stage, having the density processing module 220 stop executing graph traversal, and saving the second executive state and data of the current graph traversal, then having the sparsity processing module 210 execute the graph traversal process instead, and turning into Step S18;

Step S18: executing the ending stage of graph traversal in the sparsity processing module 210, and executing Step S19 during execution;

Step S19: having sparsity processing module 210 determine whether traversal ends, if no, repeating Step 18 to continue to execute graph traversal, if yes, having the sparsity processing module 210 process the acquired executive result into result data and write the result data into the global memory 230.

According to an embodiment, the method may use a dispatcher module to determine the executive properties of graph traversals. The dispatcher module can recognize executive properties. If the degree of parallelism of the execution matches low-parallelism executive properties, the process can be executed in the sparsity processing module 210. If the degree of parallelism increases to match high-parallelism executive properties, the process is executed in the density processing module 220.

According to an embodiment, after the first processor 100 acquires the result data, it executes CSC compression on the result data, and processes the result data according to the requirements for result processing set by the user. Then it outputs the result for display as required by the user. The graph data is stored as CSC compressed data. The requirements for result processing set by the user may be, for example, building a traversal tree and marking leading nodes.

According to another aspect of the present disclosure, what is disclosed is an FPGA-based graph traversal system, which is useful to execute every step of the method of the present disclosure, thereby achieving the expected technical effects.

The description for the same or similar parts of various embodiments are omitted so as to obscure the spirit of the present disclosure.

According to various embodiments, the system can be used for executing graph traversals on a graph having characteristics of a small world network, the system may include a first processor 100 and a second processor 200 that is in communicative connection with the first processor 100, wherein the first processor 100 is a CPU and the second processor 200 is an FPGA, wherein the first processor 100 sends graph data to be traversed to the second processor 200, and the first processor 100 obtains result data of the graph traversals from the second processor 200 for result output after the second processor 200 has completed the graph traversals of the graph data by executing level traversals. The second processor 200 may include a sparsity processing module 210 for graph traversal in the low-parallelism beginning and/or ending stages and a density processing module 220 for graph traversal in the high-parallelism intermediate stage. The sparsity processing module 210 has a first amount of arithmetic-logic units for graph traversal and the density processing module 220 has a second amount of arithmetic-logic units for graph traversal. The first amount is smaller than the second amount.

According to some embodiments, first processor 100 may be configured to: acquire result data and output the result based on the result data according to the user's setting.

According to some embodiments, the difference between the first amount and the second amount is of at least one order of magnitude. In an embodiment, the difference between the first amount and the second amount is of at least two orders of magnitude.

According to some embodiments, the sparsity processing module 210 can take the initial node selected by the user as an origin for division to divide the graph data using a heuristic algorithm so as to obtain plural data blocks. The sparsity processing module 210 can select and transmit the data block containing the initial node from the plural data block to the on-chip memory 240 of the second processor 200.

According to some embodiments, the system may further include an executive-state-analyzing module 250.

According to some embodiments, the sparsity processing module 210 may include at least one of a beginning pre-processing unit, a first arithmetic-logic unit and an ending processing unit. The beginning pre-processing unit serves to pre-process the data block containing the initial node so as to identify the initial node for traversal. The ending processing unit serves to execute the subsequent operation of the traversal algorithm by processing the executive result data, compressing the executive result, and transmitting it to the global memory 230.

The FPGA-based graph data processing method and system of the present disclosure have at least the following advantages:

(1) The present disclosure implements an FPGA-based graph computing design, so as to avoid the complicated control and operations as required by a CPU-FPGA heterogeneous graph computing system;

(2) The present disclosure implements an FPGA-based graph computing design, so as to avoid enormous time costs caused by processor switch, data transmission, processor downtime and executive state reconstructing during traversal operation between the CPU and the FPGA;

(3) The present disclosure leverages the programmability of the FPGA and the features of graphs with small-world network characteristics during graph traversal, and designs two functional modules corresponding to two stages of traversals to execute these traversal stages respectively, thereby accomplishing optimization of graph traversal; and (4) The present disclosure employs an executive state analyzing method to acquire the traversal trend of data processing, and to predict the data area to be reached in the subsequent graph traversals, so it can deliver the data blocks required by subsequent traversals to the on-chip memory before execution of the subsequent traversal iteration, which allows the traversals to be executed quickly without wasting the time waiting for transmitting the required data blocks to the BRAM.

While the above description has illustrated the present disclosure in detail, it is obvious to those skilled in the art that many modifications may be made without departing from the scope of the present disclosure and all such modifications are considered a part of the present disclosure. In view of the aforementioned discussion, relevant knowledge in the art and references or information that is referred to in conjunction with the related art (all incorporated herein by reference), further description is deemed necessary. In addition, it is to be noted that every aspect and every part of any embodiment of the present disclosure may be combined or interchanged in a whole or partially. Also, people of ordinary skill in the art shall appreciate that the above description is only exemplificative, and is not intended to limit the present disclosure.

The above discussion has been provided for the purposes of exemplification and description of the present disclosure. This does not mean the present disclosure is limited to the forms disclosed in this specification. In the foregoing embodiments, for example, in order to simplify the objectives of the present disclosure, various features of the present disclosure are combined in one or more embodiments, configurations or aspects. The features in these embodiments, configurations or aspects may be combined with alternative embodiments, configurations or aspects other than those described previously. The disclosed method shall not be interpreted as reflecting the intention that the present disclosure requires more features than those expressively recited in each claim. Rather, as the following claims reflect, inventive aspects lie in less than all features of a single foregoing disclosed embodiment. Therefore, the following claims are herein incorporated into the embodiments, wherein each claim itself acts as a separate embodiment of the present disclosure.

Furthermore, while the description of the present disclosure includes description to one or more embodiments, configurations or aspects and some variations and modifications, other variations, combinations and modifications are also within the scope of the present disclosure, for example within the scope of skills and knowledge of people in the relevant field, after understanding of the present disclosure. This application is intended to, to the extent where it is allowed, include rights to alternative embodiments, configurations or aspects, and rights to alternative, interchangeable and/or equivalent structures, functions, scopes or steps for the rights claimed, no matter whether such alternative, interchangeable and/or equivalent structures, functions, scopes or steps are disclosed herein, and is not intended to surrender any of the patentable subject matters to the public.

What is claimed is:

1. A field programmable gate array (FPGA)-based graph data processing method for executing graph traversals on a graph having characteristics of a small-world network, the method comprising:
   executing the graph traversals using a first processor and a second processor,
   wherein the second processor is in communicative connection with the first processor, and
   wherein the first processor is a CPU and the second processor is an FPGA;
   wherein the first processor:
   sends graph data to be traversed to the second processor; and
   obtains result data of the graph traversals from the second processor for result output after the second processor has completed the graph traversals of the graph data by executing level traversals;
   wherein the second processor comprises a sparsity processing module and a density processing module, which respectively use on-chip logical resources in different areas of the second processor,
   wherein the density processing module has a higher degree of parallelism than that of the sparsity processing module,
   the sparsity processing module works in at least one of the beginning stage and an ending stage of the graph traversals where parallelism is low, and
   the density processing module works in the intermediate stage of the graph traversals where parallelism is high;
   wherein before the second processor executes the graph traversals, the first processor first programs an algorithmic logic for the graph traversals to be executed into a logic circuit of the second processor, and then transmits the graph data to be traversed into a global storage of the second processor; and
   wherein the sparsity processing module takes a selected initial point as an origin for division to divide the graph data in the global storage into plural data blocks using a heuristic algorithm, and then selects a data block containing the initial point from the plural data blocks and transmits the data block containing the initial point to an on-chip memory of the second processor.

2. The method of claim 1, wherein the sparsity processing module performs the steps of:
   determining an initial node of the traversals based on the data block containing the initial node in the on-chip memory;
   executing the graph traversals in the beginning stage from the initial node; and
   analyzing and identifying which stage the graph traversals are in while executing the graph traversals, and when the graph traversals are in the beginning stage with low-parallelism, proceeding with the graph traversals in the sparsity processing module, and when the graph traversals enter the intermediate stage with high-parallelism, stop executing the graph traversals, saving a first executive state and the data as they are at the stopping moment, and then requiring the density processing module to execute the graph traversals after the data are saved.

3. The method of claim 2, wherein the density processing module performs the steps of:
   acquiring the first executive state and the data saved by the sparsity processing module and rebuilding the first executive state of the graph traversals according thereto;
   when the first executive state of the graph traversals has been reconstructed, executing the graph traversals based on the data saved by the sparsity processing module; and
   analyzing and identifying which stage the graph traversals are in while executing the graph traversals, and when the graph traversals are in the intermediate stage with high-parallelism, proceeding with the graph traversals in the density processing module, and when the graph traversals enter the ending stage with low-parallelism, stop executing the graph traversals, saving a second executive state and the data as they are at the stopping moment, and then requiring the sparsity processing module to execute the graph traversals after the data are saved.

4. The method of claim 2, wherein the sparsity processing module further performs the steps of:
   acquiring the second executive state and the data saved by the density processing module and rebuilding the second executive state according thereto;
   when the second executive state has been reconstructed, executing the graph traversals based on the data saved by the density processing module; and
   analyzing and identifying whether the graph traversals have been completed while executing the graph traversals, and when the graph traversals have not been completed, proceeding with the graph traversals, and when the graph traversals have been completed, processing an acquired executive result so as to obtain result data of the graph traversals, and writing the result data into the global memory.

5. The method of claim 4, wherein the step of analyzing and identifying whether the graph traversals have been completed comprises:

when the nodes adjacent to the currently traversed node have all been marked as traversed, comparing the nodes of the graph with the nodes that have been traversed, and where all the nodes are confirmed as traversed, determining that the graph traversal is complete, and where there is still a node not traversed, determining that there is a subgraph that has not been traversed, and analyzing the data block in which there is the node that has not been traversed and transmitting the data block into the on-chip memory, so as to initiate the graph traversal in the subgraph by means of initial node sampling.

6. The method of claim 5, wherein the method further comprises: building an executive-state-analyzing module in the second processor, where the executive-state-analyzing module performs the steps of:
determining the data block required by at least one of the sparsity processing module and the density processing module in the successive graph traversal by analyzing and identifying an executive state for which the at least one of the sparsity processing module and the density processing module executes the graph traversals; and
transmitting that required data block to the on-chip memory before the next traversal iteration.

7. A field programmable gate array (FPGA)-based graph traversal system for executing graph traversals on a graph having characteristics of a small world network, the system comprises a first processor and a second processor, wherein the second processor is in communicative connection with the first processor, and wherein the first processor is a CPU and the second processor is an FPGA;

wherein the first processor is configured to:
send graph data to be traversed to the second processor;
obtain result data of the graph traversals from the second processor for result output after the second processor has completed the graph traversals of the graph data by executing level traversals; and
the second processor comprises a sparsity processing module and a density processing module, which respectively use on-chip logical resources in different areas of the second processor, the density processing module has a higher degree of parallelism than the sparsity processing module, the sparsity processing module is configured to operate in a beginning stage and/or an ending stage of the graph traversals where parallelism is low, and the density processing module is configured to operate in the intermediate stage of the graph traversals where parallelism is high;
wherein before the second processor executes the graph traversals, the first processor is configured to first program an algorithmic logic for the graph traversals to be executed into a logic circuit of the second processor, and then transmit the graph data to be traversed into a global storage of the second processor; and
the sparsity processing module is configured to take a selected initial point as an origin for division to divide the graph data in the global storage into plural data blocks using a heuristic algorithm, and then select a data block containing the initial point from the plural data blocks and transmits the data block containing the initial point to an on-chip memory of the second processor.

8. The system of claim 7, wherein the sparsity processing module is further configured to:
determine an initial node of the traversals based on the data block containing the initial node in the on-chip memory;
execute the graph traversals in the beginning stage from the initial node; and
analyze and identify which stage the graph traversals are in while executing the graph traversals, and when the graph traversals are in the beginning stage with low-parallelism, proceed with the graph traversals in the sparsity processing module, and when the graph traversals enter the intermediate stage with high-parallelism, stop executing the graph traversals, save a first executive state and the data as they are at the stopping moment, and then require the density processing module to execute the graph traversals after the data are saved.

9. The system of claim 8, wherein the density processing module is configured to:
acquire the first executive state and the data saved by the sparsity processing module and reconstruct the first executive state of the graph traversals according thereto;
when the first executive state of the graph traversals has been reconstructed, execute the graph traversals based on the data saved by the sparsity processing module; and
analyze and identify which stage the graph traversals are in while executing the graph traversals, and when the graph traversals are in the intermediate stage with high-parallelism, proceed with the graph traversals in the density processing module, and when the graph traversals enter the ending stage with low-parallelism, stop executing the graph traversals, save a second executive state and the data as they are at the stopping moment, and then require the sparsity processing module to execute the graph traversals after the data are saved.

10. The system of claim 8, wherein the sparsity processing module is further configured to:
acquire the second executive state and the data saved by the density processing module and reconstruct the second executive state according thereto;
when the second executive state has been reconstructed, execute the graph traversals based on the data saved by the density processing module; and
analyze and identify whether the graph traversals have been completed while executing the graph traversals, and when the graph traversals have not been completed, proceed with the graph traversals, and when the graph traversals have been completed, process an acquired executive result so as to obtain result data of the graph traversals, and write the result data into the global memory.

11. The system of claim 8, wherein the system is further configured to: build an executive-state-analyzing module in the second processor,
wherein, the executive-state-analyzing module is configured to:
determine the data block required by at least one of the sparsity processing module and the density processing module in the successive graph traversal by analyzing and identifying an executive state for which at least one of the sparsity processing module and the density processing module executes the graph traversals, and transmit that required data block to the on-chip memory before the next traversal iteration.

12. An FPGA-based graph data processing method, comprising:
sending, by a first processor, graph data to be traversed to a second processor which is communicative with the first processor, wherein the first processor is a CPU and the second processor is an FPGA, the graph data representing a graph having characteristics of a small-world network;
executing, by the second processor, graph traversals on the graph data by performing, by a sparsity processing module of the second processor, graph traversals in a beginning stage and/or an ending stage of the graph traversals where parallelism is low and performing, by density processing module of the second processor, graph traversals in an intermediate stage of the graph traversals where parallelism is high, wherein the sparsity processing module and the density processing module respectively use on-chip logical resources in different areas of the second processor, and the density processing module has a higher degree of parallelism than that of the sparsity processing module;
obtaining, by the first processor, result data of the graph traversals from the second processor for result output after the second processor has completed the graph traversals of the graph data by executing level traversals.

13. The method of claim 12, further comprising:
programming, by the first processor, an algorithmic logic for the graph traversals to be executed into a logic circuit of the second processor, before sending the graph data to be traversed into a global memory of the second processor, and
taking, by the sparsity processing module, a selected initial node as an origin for division to divide the graph data in the global memory into plural data blocks using a heuristic algorithm; and
selecting, by the sparsity processing module, a data block containing the initial node from the plural data blocks and transmitting, by the sparsity processing module, the data block containing the initial node to an on-chip memory of the second processor.

14. The method of claim 12, further comprising:
determining, by an executive-state-analyzing module of the second processor, the data block required by the sparsity processing module and/or the density processing module in the successive graph traversal by analyzing and identifying an executive state for which the sparsity processing module and/or the density processing module executes the graph traversals, and transmit that required data block to the on-chip memory before the next traversal iteration.

\* \* \* \* \*